US007635101B1

(12) United States Patent
Mah et al.

(10) Patent No.: US 7,635,101 B1
(45) Date of Patent: Dec. 22, 2009

(54) MULTI-GRATER

(75) Inventors: Pat Y. Mah, Kowloon (HK); Alexander Joseph Kalogroulis, Coulsdon (GB)

(73) Assignee: Daka Research Inc. (Br. Virg.Isl Corp.), Offshore Incorporations, Tortolla, Br. (VG)

( * ) Notice: Subject to any disclaimer, the term of this patent is extended or adjusted under 35 U.S.C. 154(b) by 0 days.

(21) Appl. No.: 12/283,485

(22) Filed: Sep. 12, 2008

(51) Int. Cl.
*A47J 43/25* (2006.01)
(52) U.S. Cl. .................... 241/92; 241/273.2
(58) Field of Classification Search .............. 241/92, 241/273.1, 273.2
See application file for complete search history.

(56) References Cited

U.S. PATENT DOCUMENTS 4,588,136 A * 5/1986 Homma ............ 241/95
2009/0050723 A1 * 2/2009 Eikelenberg et al. ..... 241/273.1
2009/0200408 A1 * 8/2009 Fritz-Jung .............. 241/92

* cited by examiner

*Primary Examiner*—Faye Francis
(74) *Attorney, Agent, or Firm*—Curtis L. Harrington; Kathy E. Harrington; Harrington & Harrington (57) ABSTRACT

A battery powered, automatic feed, disc type grater with a storage cover, interchangeable discs and waterproof motor gives users the ability for one touch operation and extended refrigerator storage and tap water cleaning of the components of the grater. A storage cap/container provides extended storage capability, while a ring stand enables the grater to be operated with the touch of a button while the grater is suspended over an area into which grated material may fall. A pusher assembly provides constant and automatic pressure on a material to be grated and against a grater disk, and a divider sleeve derives turning resistance for material to be grated from the pusher assembly while protecting the holder from contact with the material to be grated.

8 Claims, 6 Drawing Sheets

MULTI-GRATER

FIELD OF THE INVENTION

The present invention relates to an improvements in the design and operation of a multi capable grater, utilizable with any solid food, such as cheese, bread, garlic, chocolate, bread crumbs, carrot, ice, nuts, to name but a few. In particular, the invention relates to a grater which has one touch operation, automatic feed, and the ability to use the grater as a storage unit because of its segregated vertical layout and small horizontal footprint.

BACKGROUND OF THE INVENTION

A number of motor driven graters are known. Typically these fall into three main categories, including, reciprocating, disc and cylinder. In the cylinder type, a strip of metal having raised open perforations is formed into a cylinder with the teeth facing radially outwards. When the cylinder is turned by a motor, the teeth can grate pieces or strips of cheese from a block brought into contact with the cylinder, with the grated pieces usually falling through an opening of one end of the cylinder. Usually there is a lever mounted over hopper which the user uses to press the material being grated against the turning cylinder. The quality of the grated food depends upon the pressure on the lever, and the speed of turning of the cylinder.

The disc type of grater uses a disc of metal with similar raised perforations and openings to form teeth. When turned by a motor, the disc again grates cheese when it is brought into contact with the teeth.

The reciprocating type grater substitutes a linear reciprocating motion for the rotary motion of the other types of grater. Cheese held against the teeth grates cheese in a manner similar to using a manual cheese grater, although most motorized versions utilize a moving grating platform, and most manual versions utilize a structure for moving the cheese.

For most graters, regardless of version, it is impractical to offer a cover to allow storage of grated material within a refrigerator. Also for most graters, a user applied manual force is required to maintain the contact between the object to be grated and the grating surface. This has several disadvantages. First, different users will apply different levels of force against the object to be grated. The result will be a different quality grated product. Second, and even more importantly, the user's hands and attention are both required in the grating operation. Most high quality and culinary presentation grating operations involve positioning the grater over the plate so that the grated material falls gently into an inviting pattern atop other foods. A hand operated crank grater requires the user to press the food to be grated while simultaneously pressing the food to be grated against the grating surface, all while positioning the device over food located on a plate and also while trying to steady the exit port of the grater in the correct way over the food on the plate. A weak or unsteady user may inadvertently spill the food off the plate.

Even in the case of a motorized grater, the user is typically required to press the feed lever to urge the material being grated against the grating surface, and hold the actuation button with the other hand, resulting in a two handed operation. Again, the quality of grated product is likely to have an uneven quality depending upon who is operating the grater. In addition, the operator essentially has no free hand and cannot perform related tasks, such as providing a simultaneous mixing of other grated material or trying to create a food or color blend with other grated materials, or even in simply adding another ingredient.

Most grating is done by food processors which are not suitable for storage with the food being processed or grated, and are difficult to clean. Such food processors often fall into disuse directly because of the trouble involved in setup, use, and subsequent difficulty in cleaning and storing.

What is needed is a grater which is completely portable and can be operated with one hand. What is also needed is a grater which can be reliably and completely cleaned and which has a drive which is practically isolated from the material to be grated. The needed grater should be small enough and inexpensive enough that it can be used as a container set which may include long term storage of the material to be grated, and which presents simple steps for cleaning, loading of material to be grated and change of grating size.

SUMMARY OF THE INVENTION

There is provided a battery powered, automatic feed, disc type grater with a storage cover, interchangeable discs and which has a waterproof motor compartment for easy washing. The grater is an integrated unit which consists of a power head containing a motor, batteries, gearbox and output Shaft, a holder for containing the cheese to be grated and an automatic pusher feed that urges the material to be grated into force contact with an interchangeable rotating grating disc.

The waterproofed design allows the power head, or main housing, with its battery cover and seal in place to be washed under a flowing water tap. Spring sets which are used to apply force to the material to be grated allow one handed action. A ring stand can be used, or a support ring and storage cap/container to provide directed reception of grated material. The use of the legged ring stand enables hands free support of the multi-grater above any container or plate/surface. The use of a shared lid for simultaneous use with grater and storage box gives great flexibility in use and in long term refrigerator storage.

To load cheese in the multi-grater, the holder is uncoupled from the main housing (held in place with multiple bayonet structure) and removed while a the grating disc and divider remains in place in place. Pieces of material to be grated, such as cheese, are placed either side of the divider and up to a maximum fill level. A two section feed pusher contains a pair of relatively strong spring sets that urge the pusher away from the main housing. When the holder is empty, the pusher is free to move to a position in which it almost touches, but stops short of the grating structures on the grating disc. Stops on the divider stop the travel of the pusher. A rotating stop structure allows the grater disk to turn without falling below the holder device. When the holder contains the desired level of material to be grated, the act of re-attaching the holder cause the pusher to compresses the spring sets as the holder is re-creating a force that keeps the cheese in good contact with the grating disc. Therefore during reassembly, the pusher touches the material to be grated and is pushed up into the main housing head, compressing the spring sets. When the holder is in the assembled position it can be twisted to relock the bayonets.

Pressing the On/Off button activates the switch resulting in the grating disc rotating and grating of the material to be grated. Grating can continue as specified by the user's actuation of the on-off switch. If grating is allowed to continue by leaving the switch on, the pusher will be forced out to its fullest extent. Again, when the material to be grated is depleted, further movement of the pusher is limited by the stops on the divider.

It should be noted that at this fully extended limit, the combined spring force of the spring sets may be about 25 Newtons, rather than zero. This is because the spring sets consist of two plastic moldings that trap a spring that would need to extend considerably more before the spring force dropped to zero. By using the spring sets which are loaded in this way, the minimum grating force is about 25 Newtons while the fully compressed spring sets, when the holder is full of cheese, is about 45 Newtons. To avoid the user being injured by the springs extending to their full unextended length, the spring set moldings, which are clothespin shaped, also limit the maximum spring extension to about 2 mm more than the length required when the holder is empty. In this way the user can unlock the holder bayonets and not have the springs extend to a long and unmanageable length.

Furthermore, the ends of the moldings or pair of opposing clothespin shaped structures of the spring set also grip the main housing and the pusher respectively. This means that the pusher will not fall away from the main housing during loading of the material to be grated. However, the pusher and spring assemblies can be fully dismantled with a gentle tug, to facilitate a full cleaning.

The holder, divider and grater disc can be split apart for cleaning. When assembled, the grater disc can rests on a lip at the base of the holder. The divider traps the grater disc in position and rests on a lip on the internal wall of the holder. In this way, the grater disc is free to rotate without becoming trapped between the divider and the holder. The pusher is free to slide inside the divider until it comes up against stops at the base of the divider. This stops the divider ever coming into contact with the teeth on the grater disc.

The divider has a pair of opposed walls that split the cheese receiving cavity into two halves. These walls act to stop the cheese from simply turning continuously around and around if the teeth on the grating disc dig into the cheese. In addition they support a central tube through which the shaft is passed during assembly. This tube aligns the shaft with an insert in the centre of the grater disc. The insert is fastened to the grater disc and has an internal hole with a plurality of splines. This large number of splines corresponds with an equal number of splines on the shaft. The large number of splines ensures that if there is a mismatch of alignment between the splines on the shaft and in the insert, only a small degree of rotation of the holder/grater disc/divider is required to ensure engagement. The free rotation of the holder around the outside of the divider along with the free rotation of the grater disc between the holder and the divider, allow the holder to be rotated so that the bayonets between the holder and the power head engage. This rotation is resisted if there is material to be grated, under spring pressure, between the pusher and the grating disc.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

The description and operation of the multi-grater of the invention will be best described with reference to FIG. 1 which illustrates the multi-grater 31 seen over a support ring 33 and lower storage cap/container 35. The multi-grater 31 has a compact, unitary structure seen as a cylindrical overall shape having a diameter of about three inches. The multi-grater 31 is seen as having a battery cover 37 having a saddle shaped upper portion and supporting an on/off membrane switch 39, which is typically an elastomeric material, within the saddle shaped portion of the battery cover 37. The saddle shape better enables the multi-grater 31 to be grasped with one hand while a user may selectively activate the on/off membrane switch 39 at will.

The multi-grater 31 may include a seal 41 within a housing indent so that the upper portion of the multi-grater 31 will be sealed, between the battery cover 37 and a main housing 43. Below the main housing 43 a holder 45. As will be seen, the holder 45 provides a chamber for holding the material to be grated under a force loaded condition against a grater disk (not seen in FIG. 1). The holder 45 also provides an inner lip or raceway (not seen in FIG. 1) to hold the grater disk axially within the holder 45 and yet permit it to rotate. As will be shown, removal of the battery cover 37 will permit access to the battery chamber, and removal of the holder 45 will give user access to the inside of the holder 45 for the purpose of placing material to be grated, or for changing the grater disk.

Below the holder 45, the support ring 33 illustrates it as having an inwardly directed radial lip 51, the innermost extent of which provides an opening 53. The inwardly directed radial lip 51, when the support ring 33 is used, positively engages the bottom of the holder 45 to prevent the holder 45 from passing into the lower storage cap/container 35. The support ring 33 includes a vertical wall 55 which has a diameter to allow the bottom portion of the cylindrical surface of the holder 45 to enter, but to the extent that the holder 45 contacts the inwardly directed radial lip 51. The inner vertical wall 55 terminates at a flaring lip 57 to help guide the bottom of the holder 45 into place.

At the outside of the ring 33, an exterior wall 59 has a diameter which will enable it to fit snugly within an internal diameter of the lower storage cap/container 35. The lower storage cap/container 35 has an upper rim 63 which is circular but for the interruption of a pair of curved portions 65 to assist in gaining a finger or fingernail hold on the flaring lip 57 to separate the ring 33 from the lower storage cap/container 35. Lower storage cap/container 35 also has a vertical cylindrical wall 67 and includes a floor 69. In essence, the lower storage cap/container 35 forms a cup which, with the assistance of ring 33 permits it to be stacked to catch grated material which passes from the bottom of the holder 45. Further, an inside diameter of the vertical cylindrical wall 67 is about the same diameter of the internal vertical wall 55 of the ring 33, so that the holder 45 can pass into the lower storage cap/container 35 when the ring 33 is removed as an intermediate vertical stop and axial spacing member. This helps the user by providing a more sealed assembly, where the user uses the multi-grater 31 as a periodic dispensing device, to enable the user to place the material to be grated inside the multi-grater 31 for long periods of time and preferably under refrigerator storage. The multi-grater 31 then forms a nearly airtight seal between the lower storage cap/container 35, and when combined with the attachment of the battery cover 37 and holder 45 to the main housing 43 with close fitting bayonet structures, forms a sufficient seal for long term storage of material to be grated. Further, the on/off membrane switch 39 is preferably a flexible membrane which forms a seal at the top of the battery cover 37 to further exclude moisture.

Figure 2:
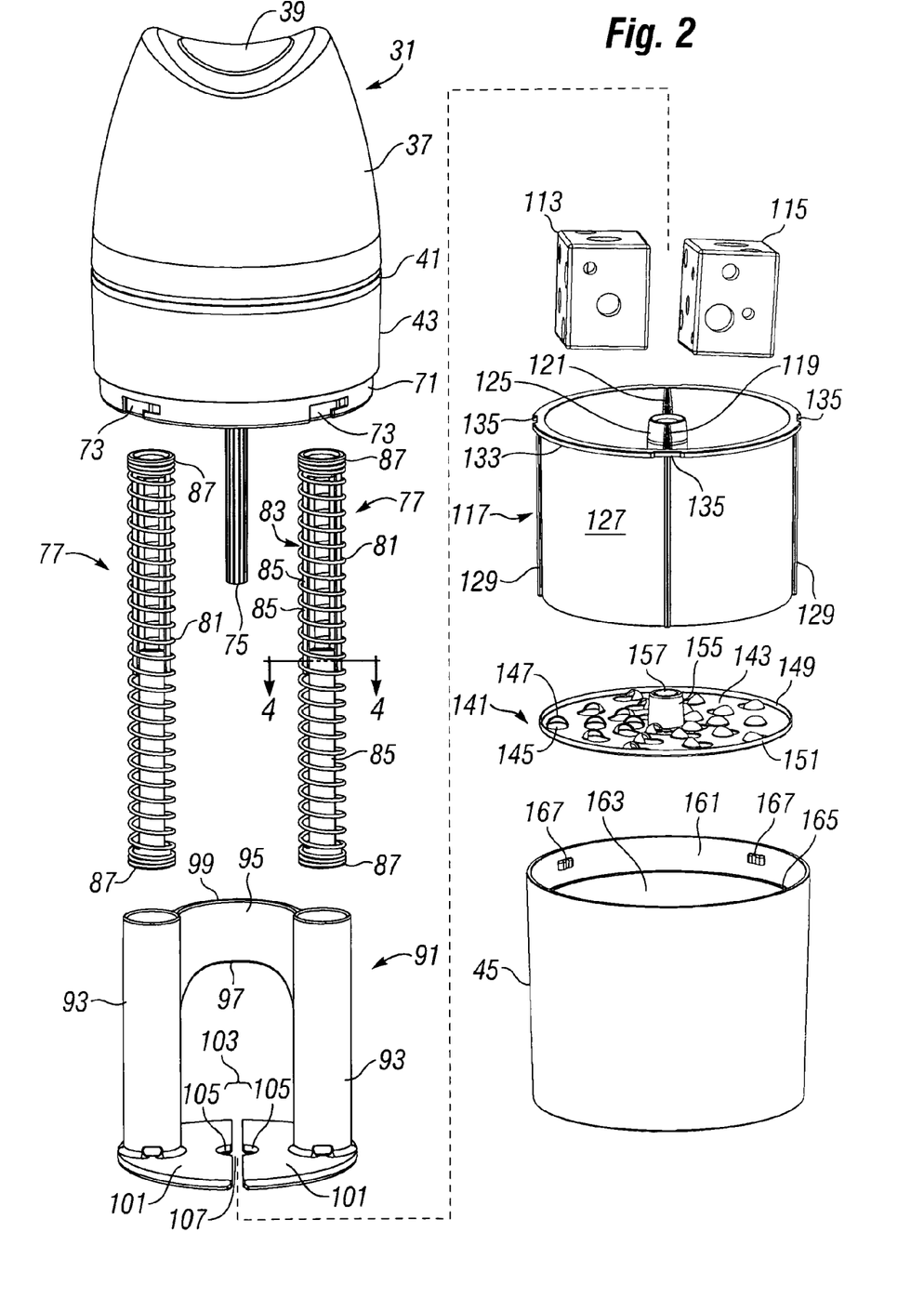
FIG. 2 is a partially exploded view of the multi-grater which illustrates details of the lower mechanical structures which provide a pressing force against the object to be grated, as well as which provide a stable turning structure.

Referring to FIG. 2, a partially exploded view of the multi-grater 31 illustrates details of the lower mechanical structures which provide a pressing force against the object to be grated, as well as which provide a stable turning structure. Main housing 43, has a lower cylindrical portion 71 which includes a set of bayonet depressions 73 to help lock the holder 45 in place, as will be shown. The outer diameter of the lower cylindrical portion 71 is sized to closely fit within an inner diameter of the top of the holder 45. Also seen extending downwardly from the multi-grater 31 is an output drive shaft 75. The surface of the output drive shaft 75 may have a suitable shape to engage a fitting or other object to transmit rotational power. The output drive shaft 75 is shown as having ribbed keying. The use of ribbed keying helps users engage and disengage the output drive shaft 75 without having to rotate the output drive shaft 75 through a number of rotational degrees in order to interfit with a fitting. Twelve ribs about the output drive shaft 75 is believed to minimize the need for problems with keying.

Below the lower cylindrical portion 71, a pair of spring sets 77 are seen. Each of the spring sets 77 include a spring 81 and a spring containment structures having pair of opposing elongate interlocking structures 85. Each spring containment structure 83 has a radial land 87 to engage the end of the springs 81, and a pair of spaced apart elongate structures 85 which fits within one end of each spring 81, and each one of the elongate structures fits alongside the similar pair of spaced apart elongate structures 85 of an opposing spring containment structure 83. The spaced apart elongate structures 85 have a cross sectional area and length such that they provide linear guidance and also help stabilize the center portion of the springs 81.

Below the spring sets 77 a pushing plunger 91 is seen. Pushing plunger 91 may be a unitary structure which includes a pair of spring guide and containment tubes 93 joined by a web 95. Web 95 may or may not be curved. The web 95 shown is shown laterally curved in a direction away from the viewer, and also has a lower vertical extent which includes a gentle curve 97 and an upper vertical extent 99 which appears curved due to the angle of presentation, but is level with the upper open ends of the spring guide and containment tubes 93.

The base of the tubes of the pushing plunger 91 each have an almost semi-circular pusher plate 101. The deviation from complete semi-circularity of each almost semi-circular pusher plate 101. Is due to a central slot space 103 formed between them, as well as a middle notch 105. The opposing middle notches 105 form a drive shaft 75 central clearance opening 107 so that drive power can be transmitted to a point below each of the almost semi-circular pusher plates 101, regardless of the vertical position of the pushing plunger 91. The lateral curvature of the web 95 enables connection of the spring guide and containment tubes 93, but standing to one side of the tubes to further accommodate the same drive shaft 75.

At the upper right of FIG. 2, a pair of materials to be grated 113 and 115 and have an exterior simulating Swiss cheese as an example. These are divided into two pieces to show that they will fit within a divider sleeve 117 which has a pair of dividers 119 and 121. The use of divider sleeve 115, having at least one of the dividers 119 and 121 provides at least one structure to prevent a rotating grating surface from moving the materials to be grated 113 and 115. Further, the at least one of the pair of dividers 119 and 121 need to extend all the way to the top of the divider sleeve 115. At minimum, if of low height, one of the pair of dividers 119 and 121 only needs to extend upwardly enough to prevent turning of a portion of a single one of the materials to be grated 113 or 115. The divider sleeve 117 may generally derive its resistance from turning by contact with the plunger 91, and particularly the semi-circular pusher plates 101 which move vertically to one side of dividers 119 and 121 and prevent their turning. Furthermore, the divider sleeve 117 protects the inside of the holder 45 from direct contact with any material to be grated 113 or 115.

Second, the use a pair of dividers of dividers 119 and 121, in some geometrically defined orientation will allow a spatial separation of materials to be grated 113 and 115 on a plate or other surface. For example, if material to be grated 113 was a carrot, and material to be grated 115 were black olives, a predominant orange/black pattern would be created as the food was grated. Of course, grated food sometimes will adhere and not drop immediately, but the half and half pattern for a pair of linear dividers 119 and 121 would result. a one-third each pattern would result if three such linear dividers were used and arranged 120° apart, or a one-fourth pattern would result if four such linear dividers were used and arranged 90° apart. Admittedly, in a three inch diameter multi-grater 31 the hoppers for the materials to be grated would begin to become very small, but such subdivision may be more preferable in a larger multi-grater 31.

Referring again to the divider sleeve 117, the pair of dividers 119 and 121 meet at a central drive shaft tube 125. The central drive shaft tube 125 surrounds the output drive shaft 75 from the point it emerges from the lower cylindrical portion 71 and isolates it from any of the materials to be grated 113 and 115. Divider sleeve 117 has a cylindrical wall 127 having series of spacing ribs 129. The top of the divider sleeve 117 has a circumferentially outwardly flange 133 interrupted by a series of notches 135 each of which only happen to occur at a position over each of the spacing ribs 129, but need not be numbered the same as or located near the spacing ribs 129.

Underneath the divider sleeve 117, a grater disk 141 is seen. Grater disk 141 is seen as having a circular planar expanse of material 143 having a series of apertures 145 adjacent raised grater structures 147. At the outer periphery of the a circular planar expanse of material 143, the material turns upward to form a circular vertical wall 149. The connection between the circular vertical wall 149 and the circular vertical wall 149. The circular planar expanse of material 143 at the lower outside of the grater disk 141 is a smooth upturn at a corner 151 which represents a low friction edge which can be supported and yet easily will turn with minimum friction.

At the center of the grater disk 141 an upstanding shaft engagement fitting 155 is seen as having an upper ribbed bore 157 which easily interfits with a short portion of the end of the output drive shaft 75. a portion of the upstanding shaft engagement fitting 155 extends through the circular planar expanse of material 143 and is engaged through and back onto the underside of the circular planar expanse of material 143 but cannot be seen in the perspective of FIG. 2.

Below the grater disk 141 some of the inner detail of the holder 45 can be seen. Inside the holder 45, a slightly expanded internal diameter upper section of bore 161 is seen just above a slightly reduced diameter section of bore 163 and they are separated by a diameter transition 165. The slightly expanded internal diameter upper section of bore 161 has a depth and internal diameter matching the lower cylindrical portion 71 of the main housing 43. The slightly expanded internal diameter upper section of bore 161 supports a series of circumferentially inwardly disposed bayonet projections 167 which are complementary to the set of bayonet depressions 73 seen on the cylindrical portion 71 of the main housing 43. Not seen in FIG. 2 are the internal lower details of the main housing 43 which extend circumferentially inwardly to cradle and rotationally support the grater disk 141 at the corner 151 and extending slightly inwardly of the corner 151 to restrain grater disk 141 from falling or passing through the bottom of the holder 45.

Figure 4:
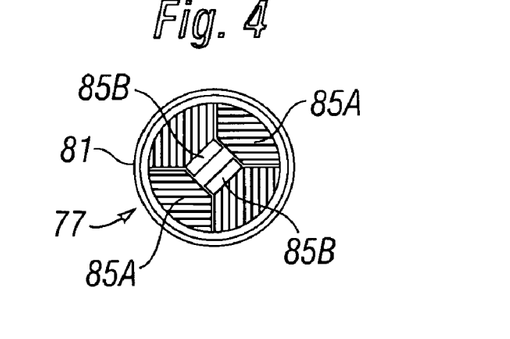
FIG. 4 is a sectional view taken along line 4-4 of FIG. 2.

Referring to FIG. 4, a sectional view taken along line 4-4 of FIG. 2 illustrates further details of the spring 81 and pair of opposing spring containment structures 83. At the bottom of the holder 454, to the inside, a concentrically inwardly projecting inward rim 171 is seen supporting the grater disk 141 near its rounded corner 151. As can be seen, the grater disk 141 cannot pass through the bottom of the holder 45. Even when being loaded into the holder 45 with a position half turned, the effective diameter of the inward rim 171 is such that the grater disk will be easily captured by the holder 45 and almost automatically be righted into its operating position.

In the sectional view of FIG. 3, further details of the shaft engagement fitting 155 are seen in a perspective sectional view of a partial assembly of the structures seen in FIG. 2. a small lower portion 173 is seen extending below the circular planar expanse of material 143 and is captured by the circular planar expanse of material 143. The lower center of the shaft engagement fitting 155 is seen as having an aperture 175. As can be seen, the bottom of the central drive shaft tube 125 has an expanded diameter bore portion 179 to allow the shaft engagement fitting 155 to rotate with respect to the lower inside portion of the central drive shaft tube 125.

Figure 3:
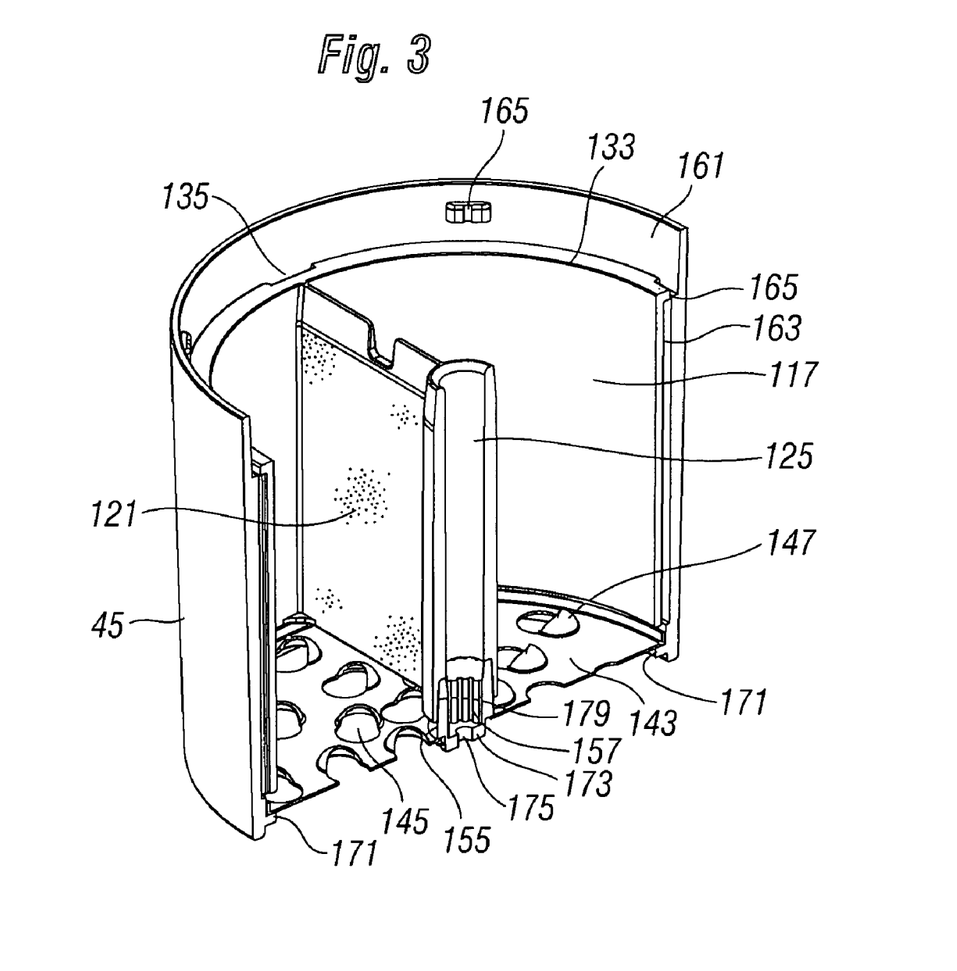
FIG. 3, illustrates a perspective sectional view of a partial assembly of the structures seen in FIG. 2.

As can be seen in FIG. 3, the clearance between the bottom of the divider 121 and the tops of the raised grater structures 147 is more than sufficient for free rotation. Any materials to be grated 113 or 115 will be under downward force urging from the almost semi-circular pusher plate 101 and may turn only slightly with the circular planar expanse of material 143 before one of the pair of dividers 119 and 121 is encountered. Then, as the circular planar expanse of material 143 continues to turn and slide beneath the materials to be grated 113 or 115, grating occurs as small slivers of material are cut by the raised grater structures 147 and pass through the series of apertures 145 below the turning grater disk 141. The multi-grater 31 can be grasped and actuated with one hand while held over a plate or other object to insure that grated material falls freely and lightly, without compression, preferably directly on food to be supplemented or seasoned.

Referring to FIG. 4, a sectional view of the spaced apart elongate structures 85 of the spring containment structures 83 are shown. a first common pair of spaced apart elongate structures are designated 85A, while a second common pair of spaced apart elongate structures are designated 85B. The two common structures 85A slide pass and are stabilized with respect to the two common structures 85B. Spring 81 is shown partially encasing the pair of spring containment structures 83.

Figure 5:
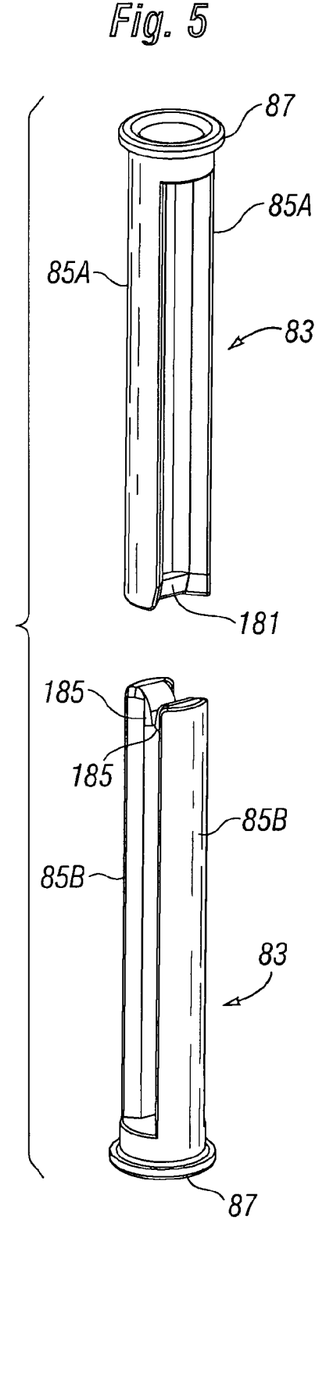
FIG. 5 is a side view of the internal spring moldings which are clothespin shaped with one having hook ends and one having a bridged end, and with the circular ends for providing stable grasping between the main housing and plunger.
Figure 6:
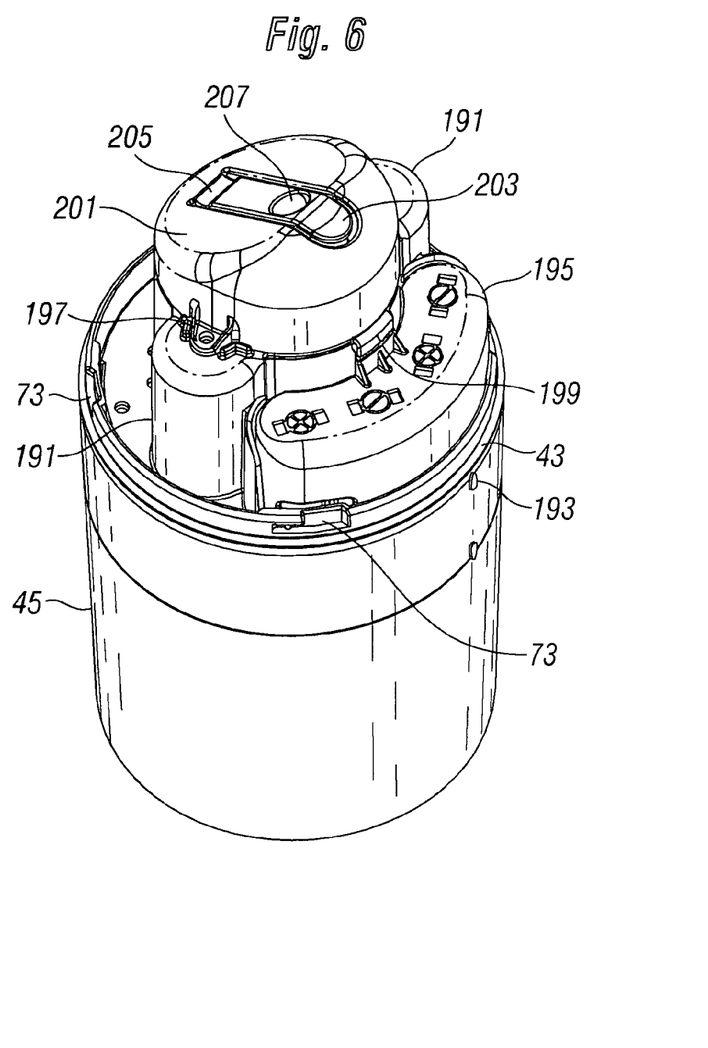
FIG. 6 is a perspective view with the battery cover removed to illustrate the external features of the main housing, including spring housings, motor and gear housing, in addition to the battery storage area.

Referring to FIG. 5, an operating pair of the spring containment structures 83 are shown adjacent each other and in a position which they may be joined by being brought toward one another and rotated slightly. The common structures 85A extend from the land 87 are joined by a web 181. The common structures 85B extend from the land 87 terminate in a pair of opposing hook structures 185 which, when the common structures 85B are rotated ninety degrees and approach the web 181, the pair of opposing hook structures 185 will pass around the web 181 to form a limit on the ability of the joined pair of opposing spring containment structures 83 to unlock from each other at their most displaced extent. Compressing the two pair of opposing spring containment structures 83 together is performed against the force of the spring 81. Further, just inside the two lands 87, a depression fits an opposing projection which is found within the terminal extent of the lower cylindrical portion 71 of the main housing 43, and within the terminal extent of the spring guide and containment tubes 93. To further orient an explanation of the overall sectional views, a perspective view of the multi-grater 31 with the battery cover 37 removed is shown in FIG. 6. The holder 45 is shown as transparent and attached to the main housing 43. Above the main housing, with the battery cover 37 removed, a further set of bayonet depressions 73 are seen which engaged with a further series of circumferentially inwardly disposed bayonet projections 167 which are near the lower inside rim of the battery cover 37 (not seen in FIG. 6).

a pair of spring housings 191 are seen, each of which accommodates one of the pair of spring sets 77 and contains the spring compression when the plunger 91 is in its uppermost position. a battery storage section 193 has a battery cover 195 which may be expected to accommodate a series of four size "AA" batteries arranged adjacent each other in an arc configuration. The battery cover 195 forms an angle with the main motor housing 197 using a latch 199.

The main motor housing 197 includes a main motor housing cover 201 having an integrally formed lever member 203 connected through a curved junction 205 and which overlies an electrical on/off switch (not seen). An indentation 207 may be present to register with a projection on the underside of on/off membrane switch 39 to help insure that any actuation anywhere on the on/off membrane switch 39 will result in actuation. Pressing the on/off membrane exterior switch 39 on the battery cover 27 will move the integrally formed lever member 203 to close an electrical switch to turn on a motor (also not seen in FIG. 6) to operate the output drive shaft 75. This electrical on/off switch may be a touch to close switch or it may be a latch switch which is pressed to turn on and stays on, and then which may be pressed to turn off, much like the action of a click action ball point pen.

Figure 7:
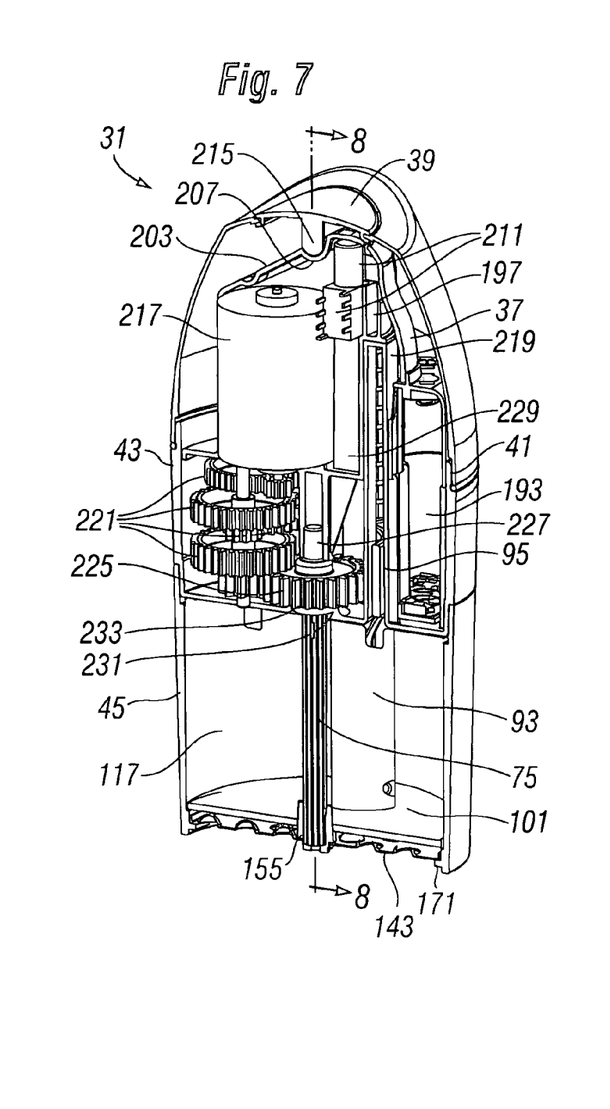
FIG. 7 is a sectional view divided between the spring sets and illustrating the motor and reduction gears and looking into half of a battery storage area.

Referring to FIG. 7, a partial half section taken through the middle of the battery storage section 193 illustrates further details. An electrical switch 211 is seen underneath the uppermost part of the integrally formed lever member 203 just to the right of indentation 207. Also seen is a downward projection 215 on the underside of the on/off membrane switch 39 which interfits with the indentation 207 of the integrally formed lever member 203.

Mechanical details on the left side of the multi-grater 31 are seen including a motor 217 having an output pinion gear 219. The output pinion gear 219 is mechanically connected to a series of mechanically interconnected reduction gears 221 which reduce the speed and increase the force of turning of the output drive shaft 75. The output drive shaft 75 is shown connected to a drive shaft gear 225 to which the drive shaft 75 is connected. Drive shaft gear 225 is interconnected to be mechanically driven by the series of mechanically interconnected reduction gears 221. The drive shaft gear 225 has an upper bearing 227 which turnably fits within a bearing support 229. Below the drive shaft gear 225 a bearing and seal combination 231 is supported by a horizontal portion 233 of the main housing 43.

Figure 8:
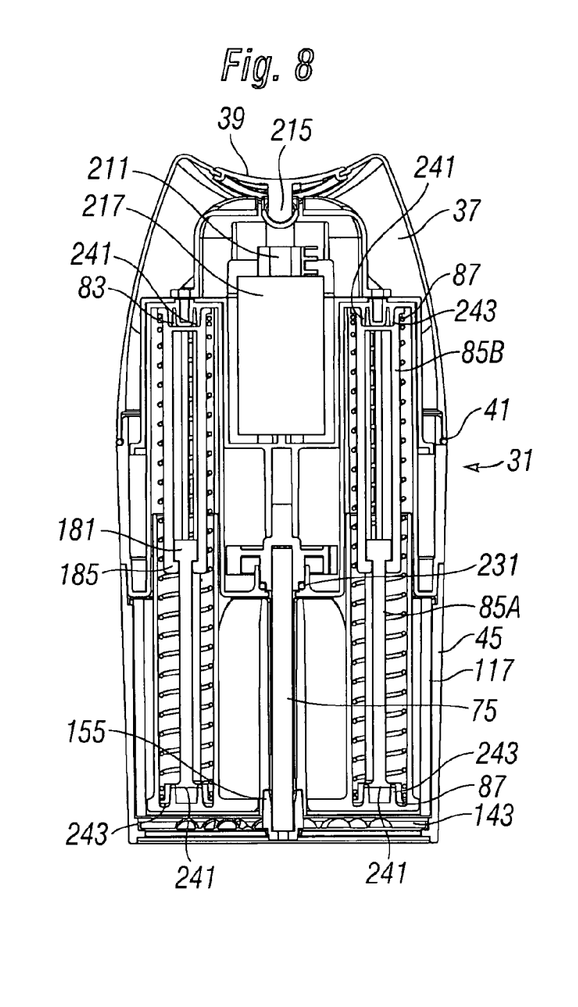
FIG. 8 is a sectional view similar to that seen in FIG. 7, but taken through the spring sets to illustrate details of the plunger/pusher and associated mechanical features.

Referring to FIG. 8 a sectional view taken through the middle of the pair of spring sets 77, in such a way that pair of opposing spring containment structures 83 have common structures 85B shown over common structure 85A. As can be seen the radial land 87 lies adjacent a plug opening 241 of each of the ends of the pair of opposing spring containment structures 83. a plug 243, seen within both the spring housings 191 and within the spring guide and containment tubes 93, is seen as interfitting with the plug opening 241 to help stabilize each of the spring sets 77 so that the combination of the main housing 43, spring sets 77 and plunger 91 will be held together even when the holder 45 and divider sleeve 117 is removed. This helps the user load new materials to be grated 113 and 115 without having to re-assemble the spring sets 77 and plunger 91 into the main housing 43 each time. This makes changing or re-loading the materials to be grated 113 and 115 occur much more quickly.

Figure 1:
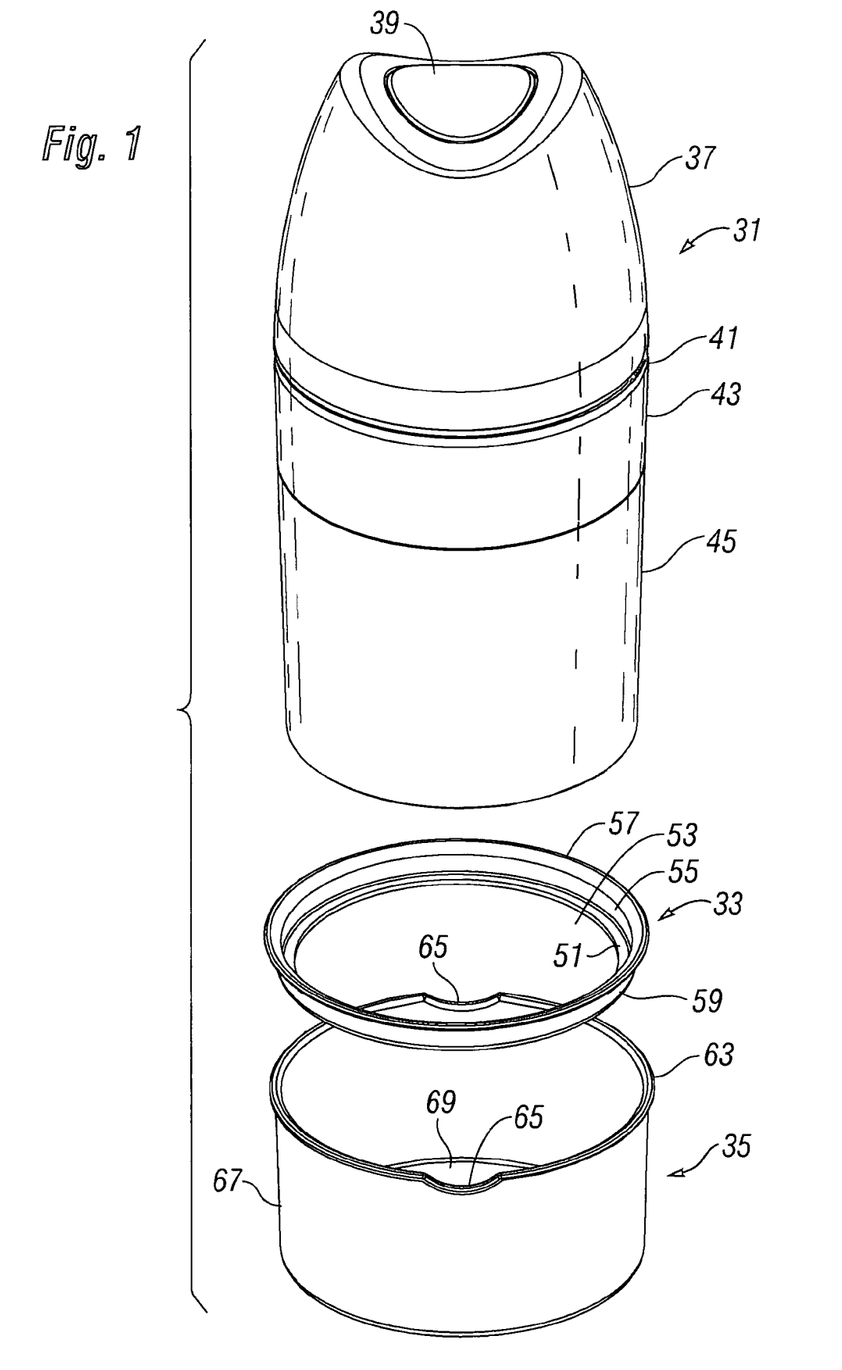
FIG. 1 is a perspective view illustrating the multi-grater over a support ring and lower storage cap/container.
Figure 9:
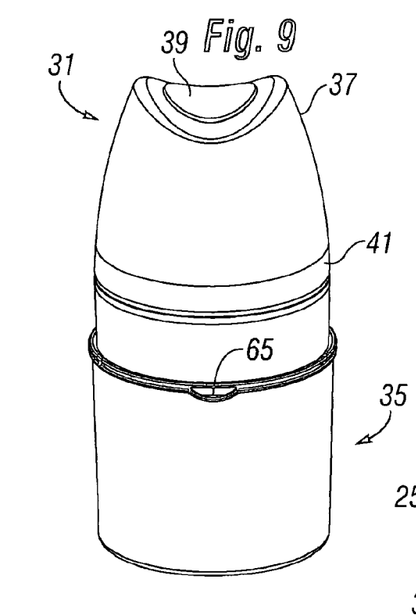
FIG. 9 illustrates the multi-grater seen in the previous Figures and in a configuration similar to that seen in FIG. 1 but without the interposing support ring to show that in its absence the multi-grater can gently slide down into the storage cap/container to form enough sealing so that the multi-grater can be used for long term storage in a refrigerator.

Referring to FIG. 9, a perspective view of the storage configuration is seen, similar to that seen in FIG. 1 but where the interposed support ring 33 is removed and where the lower storage cap/container 35 is brought up completely around the holder 45 to produce a low height configuration. This configuration is believed to be ideal for storing materials to be grated 113 and 115 in the pre-grated state as the close fitting lower storage cap/container 35 forms a seal which is nearly air tight. The clearance between the close fitting lower storage cap/container 35 and the holder 45 is preferably close and it is preferable for the top of the close fitting lower storage cap/container 35 to come upward at least as high as the holder 45.

Figure 10:
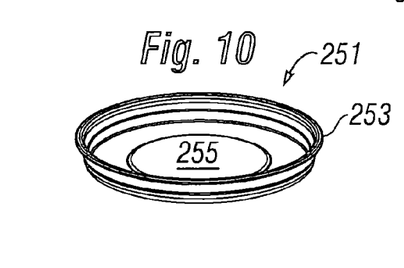
FIG. 10 illustrates a perspective view of a lid/multi-grater rest which acts to provide a handy rest for the multi-grater and as a lid which is sealable onto the storage cap/container seen in FIGS. 1 and 9.

Referring to FIG. 10, a perspective view of a container lid/multi-grater rest 251 is shown. An outer edge 253 gently flares concentrically outwardly so that the user can place the multi-grater 31 onto the container lid/multi-grater rest 251 without having to use both hands. The container lid/multi-grater rest 251 serves as a handy coaster to place the multi-grater 31 in between uses. Since the materials to be grated 113 and 115 may produce hanging "chad" or food particles beneath the grater disk 141, the use of the container lid/multi-grater rest 251 will insure that any particles attached or falling through the grater disk 141 will be isolated to one spot. The outer edge 253 insures that any grated food will stay within one area. The gently sloping transition from rim 253 to a bottom surface 255 insures that the multi-grater 31 can be grasped, lifted and replaced without having to steady the container lid/multi-grater rest 251.

Figure 11:
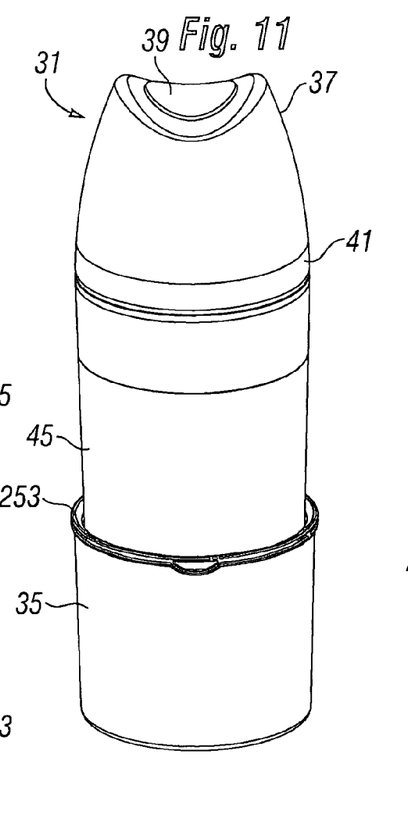
FIG. 11 is a perspective view showing that the lid/multi-grater rest seen in FIG. 10 can provide a handy rest for the multi-grater while it is in sealable position onto the storage cap/container seen in FIGS. 1 and 9.

Referring to FIG. 11, container lid/multi-grater rest 251 is shown as being a close fitting lid for the storage cap/container 35, while serving as a support for the multi-grater 31. The configuration of FIG. 11, along with the configuration of FIG. 1, as well as the configuration of FIG. 9 illustrates the laterally compact nature of the system used with the multi-grater 31, and its ability to be used in conjunction with the storage cap/container 35 and container lid/multi-grater rest 251. a user who uses the container the multi-grater 31 as a simple condiment dispenser might predominantly use the configuration of FIG. 9 for refrigerator storage. a user who wishes storage of one type of materials to be grated 113 and 115 while leaving the multi-grater 31 either empty, especially in a clean condition, or filled with materials to be grated 113 and 115. If the components seen in FIG. 1 were combined, the appearance would be essentially as seen in FIG. 11 as the support ring 33 when covered by multi-grater 31 and placed on top of storage cap/container 35, will appear similar to container lid/multi-grater rest 251.

Figure 12:
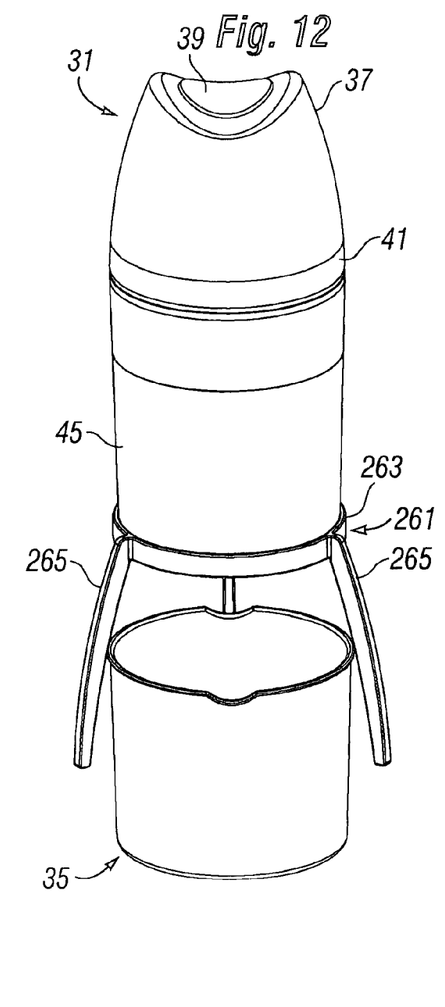
FIG. 12 is a perspective view showing the multi-grater used with a legged ring stand which can be used to elevate the multi-grater over any object or surface, such as the storage cap/container, plate or other leg supportable surface.

Referring to FIG. 12, a ring stand 261 is seen. Ring stand 261 has a ring portion 263 and may have the support details including the inwardly directed radial lip 51, opening 53, vertical wall 55, and flaring lip 57 seen in FIG. 1 with respect to support ring 33. In addition, the ring stand 261 has a number of support legs 265 extending from the ring portion 263. Ring stand 261 can be used over a plate or, as seen in FIG. 12, suspended over storage cap/container 35. The configuration of FIG. 12 is advantageous where a number of containers are sought to be positioned under the ring stand 261.

Given the configuration seen in FIG. 1, and knowing that the grating process will take materials to be grated 113 and 115 and expand their volume. Since the storage cap/container 35 is about the same size as the holder 45, it is clear that the storage cap/container 35 will not be large enough to accommodate all of the grated product from a single full loading of materials to be grated 113 and 115 from within the holder 45. Especially where the user wishes to turn the multi-grater 31 on for a considerable time in order to grate a full load of take materials to be grated 113 and 115, the use of the ring stand 261 over, perhaps a plate, will insure that all of the grated material is properly collected while the collection space is not limited. Where the grating process expands the materials to be grated 113 and 115 three, four or five times the volume, the ring stand 261 will be beneficial for extended time grating.

While the present invention has been described in terms of an integrated multi-grater, and particularly to a structure and device which solves the problem of uneven pressure provided to the material to be grated, solves the problem of producing an uneven grated product, solves the problem of requiring a user to be physically strong and requiring the user to utilize both hands and full attention at the time of grating food, and solves the problem of providing a refrigeratable container where the user wishes to use the grater primarily for dispensing one type of material to be grated over time. The combinational aspects of the grater invention are such that one skilled in the art will realize that the structure, facilitating accessories and techniques in which the objectives are achieved relating to the present invention can be applied to many structures and devices which are used for processing, storing and preparation of food items.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A grater comprising:
    a main housing;
    a motor supported within the main housing;
    a switch supported by the main housing and actuatable from outside the main housing;
    at least one battery supported within the main housing and controllably electrically connected through the switch and to the motor;
    a gear set mechanically driven by the motor and having an output drive shaft;
    a pusher assembly for providing force and displacement with respect to the main housing;
    a grater disk having a first side and a second side and having a shaft engagement fitting extending away from the first side of the grater disk for fitting onto the output drive shaft; and
    a holder having a lower end for providing support to the second side of the grater disk, and an upper end for removable attachment to the main housing, and for containing a material to be grated to be pushed by the pusher assembly and against the grater disk while the grater disk is turning to produce a grated product.

2. The grater as recited in claim 1 and further comprising a storage cap/container which fits closely around the holder to isolate and contain the material to be grated to facilitate the use of the grater for extended storage of the material to be grated within the holder.

3. The grater as recited in claim 1 and further comprising a divider, within the holder, to act to prevent material to be grated from turning as the grater disk turns.

4. The grater as recited in claim 3 wherein the divider imparts turning resistance by mechanical contact with the pusher assembly.

5. The grater as recited in claim 1 wherein the holder is round and further comprising a ring stand having a ring into which the holder fits, and having a plurality of legs attached to the ring whereby the grater may be positioned above areas to which grated material may fall.

6. The grater as recited in claim 1 wherein the switch supported by the main housing and actuatable from outside the main housing holder is actuatable through an elastomeric membrane.

7. The grater as recited in claim 1 wherein the pusher assembly further comprises:
    a spring guide and containment tube have a first end fittable into a bore within the main housing, and a second end;
    a pusher plate attached to the second end of the spring guide and containment tube; and
    a spring set within the spring guide and containment tube arranged to urge the pusher plate away from the main housing.

8. The grater as recited in claim 7 wherein the spring set further comprises:
    A spiral spring;
    a first spring guide having a first round end and a first pair of interfit structures extending away from the round end and terminating in a joining web; and
    a second spring guide having a first round end and a second pair of interfit structures extending away from the round end and terminating in web engaging structures and interfitting with the first spring guide with both first and second spring guide first and second pair of interfit structures extending adjacent each other within the spiral spring, the first and second spring guides acting to permit compression of the spiral spring, but limit the expansion of the spiral spring.

* * * * *